No. 894,091. PATENTED JULY 21, 1908.
P. E. WILLIAMS.
PISTON PACKING.
APPLICATION FILED NOV. 2, 1907.
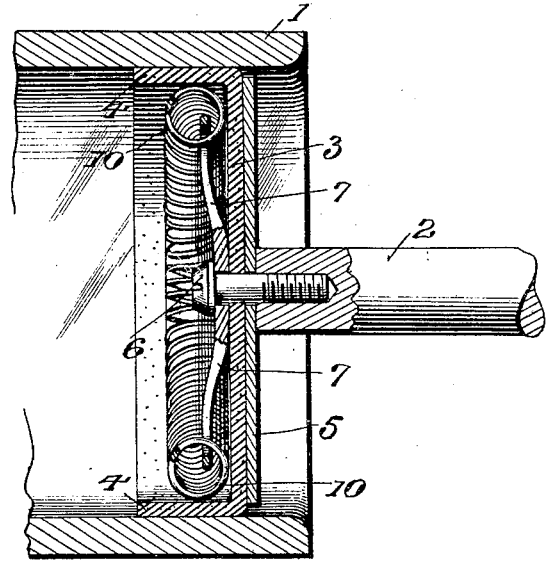
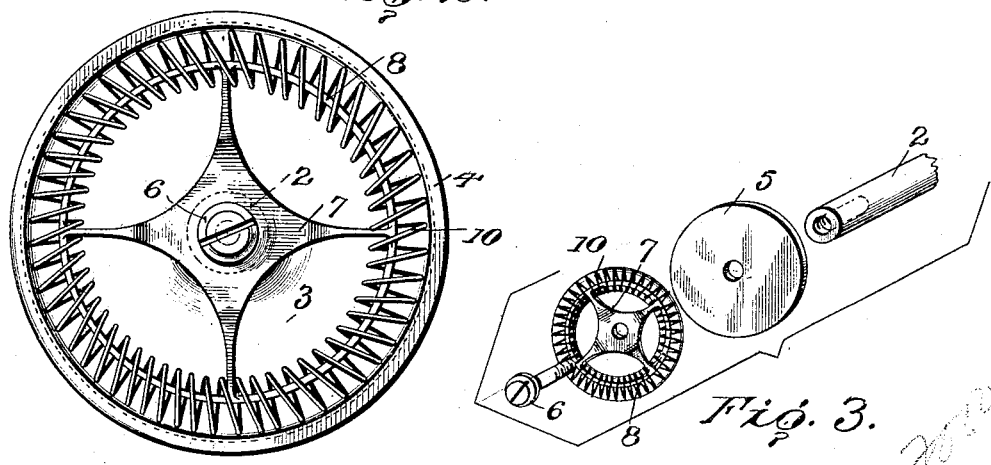
Inventor
Percy E. Williams.
Witnesses
W. A. Williams.
E. R. Pick.
By Hubert E. Peck
Attorney

UNITED STATES PATENT OFFICE.

PERCY EARL WILLIAMS, OF SAVANNAH, GEORGIA.

PISTON-PACKING.

No. 894,091.      Specification of Letters Patent.      Patented July 21, 1908.

Application filed November 2, 1907. Serial No. 400,404.

*To all whom it may concern:*

Be it known that I, PERCY EARL WILLIAMS, a citizen of the United States, residing at Savannah, Chatham county, Georgia, have invented certain new and useful Improvements in Piston-Packings; and I do hereby declare the following to be a full, clear, and exact description of the invention, such as will enable others skilled in the art to which it appertains to make and use the same.

This invention relates to certain improvements in piston packings, and relates more particularly to improvements in expanding devices for the cupped washers of pump pistons and the like; and the objects and nature of my invention will be readily understood by those skilled in the art in the light of the construction shown in the accompanying drawings as my preferred embodiment from among other arrangements within the spirit and scope of my invention.

An object of the invention is to provide an exceedingly simple, durable and inexpensive device for expanding the cupped washers of pistons for pumps or the like, whereby the working efficiency of such pistons will be increased.

The invention consists in certain novel features in construction and in combinations and arrangements of parts as more fully and particularly set forth hereinafter.

Referring to the accompanying drawings:—Figure 1, is a longitudinal sectional view through my improved piston packing, showing a portion of the cylinder in which the piston works. Fig. 2, is an end elevation of the piston. Fig. 3, is a detail detached perspective view showing the parts of the piston separated, excepting the cupped washer.

In the drawings, 1, is a cylinder such as that of an air compressor, air or water pump or any other cylinder adapted to receive a reciprocating piston having a cupped packing.

2, is the piston rod of the piston, and 3, is the disk of leather or other suitable flexible packing material having its edge deflected circumferentially and inwardly to form the flexible cupped edge 4, adapted to expand against the inner wall of the cylinder as the piston is forced inwardly to form a comparatively water or gas tight joint therewith, and to contract as the piston is drawn outwardly to permit the passage of water or gas between the same and the inner surface of the piston.

5, is the stiff backing or head of the piston which in the specific example illustrated, is in the form of a round flat metal disk secured against the end of the piston rod and fitting against the outer flat face of the packing washer or gasket 3.

The packing washer and the piston head, in the specific example illustrated, are removably secured to the piston rod by a headed machine screw 6, passed inwardly through a central perforation in a spider frame, hub 7, arranged at the inner face of the packing washer, and through the packing washer and piston head into a screw threaded hole longitudinally into the end of the piston rod. The screw passes removably through the various elements named and clamps them together removably, whereby the parts can be readily separated for repair or replacement. However, I do not wish to limit my invention to the specific construction described for securing the parts together as other devices and arrangements might be employed for this purpose.

The spider frame can be formed in one piece of metal of the required strength and stiffness and can be if found desirable cut or pressed from sheet metal. This spider frame consists of the circumferential ring 8 connected to the central portion of hub 7, by several spaced radial arms. The ring 8 is concentrically arranged within the piston and in diameter is preferably less than the diameter of the piston head 5, and than the internal diameter of the cupped edge of the packing washer. The ring 8, is spaced a distance inwardly from the normal flat position of the packing washer by any suitable means or arrangement. As a simple and effective means for this purpose, I show the spider dished with its hub 7, pressed inwardly beyond the plane of the ring 8. The hub 7, rests against the face of the washer and the radial arms incline inwardly therefrom to the ring, whereby the ring 8, is held spaced the required distance from the flat face of the washer while the hub is clamped against the same by the screw 6. An annular coiled expanding spring 10, is throughout its length coiled loosely around the ring 8, so that the spring completely surrounds and incloses the ring. The diameter of the convolutions of this coiled wire spring 10, is greater than the width and thickness of the ring 8, in cross section so that the spring is free to expand and contract on the ring to the extent of the diameter of its convolutions. The spring is arranged within the cupped edge of the washer and against the front face of the flat portion thereof, and in fact lies entirely within the washer and its cupped edge and constantly tends to press the same outwardly against the inner surface of the cylinder with a uniform light outward pressure throughout the circumference of the cupped edge, thereby taking up the wear of the washer and maintaining the desired tight rubbing contact thereof with the cylinder surface. The spring is held in proper position by the ring which also limits its movements within the necessary bounds. The spring is sufficiently light or of such strength to permit the desired slight flexing or contraction of the packing washer on the outward movement of the piston to permit the passage of gas or liquid between the cupped portion of the packing washer and the cylinder surface.

The device described is durable in construction and is composed of a small number of inexpensive parts and by employing the spring in the relation described, the efficiency of cupped washer pistons is greatly enhanced, and at the same time, in case of wear or breakage, the worn or broken spring can be easily removed and a new and proper spring inserted on the ring of the spider.

What I claim and desire to secure by Letters Patent of the United States is:—

1. A piston having a cupped packing washer, an annular expansive coiled spring lying against the inner face of the washer and within and expanding the cupped edge thereof, and supporting means for said spring.

2. An expanding device for cupped piston packing washers consisting of an annular expansive coiled spring, and a ring loosely encircled thereby and arranged therein.

3. A piston having a cupped packing washer, an expansive annular coiled spring fitted within and expanding said washer around the inner surface of the cupped edge thereof, and means loosely confining said spring against the flat inner face of the washer.

4. A piston having a cupped packing washer, and an annular coiled expanding spring resting against the inner face of the washer and fitting within the cupped edge thereof and expanding the same.

5. A piston having a cupped packing washer, a ring arranged within the cupped edge thereof and provided with securing means, and a loose annular coiled expanding spring encircling said ring loosely and fitted within and expanding the cupped edge of said washer.

6. A piston having an annular flexible packing, and a dished spider carrying a loose annular coiled spring, within said packing and expanding the same.

7. A piston having expansible packing means, in combination with an annular coiled expansible spring lying within and expanding said means, and supporting stop means carried by the piston and permitting free movement of said spring within certain limits and confining the same loosely in position within said packing means.

8. A piston having expansible packing means, in combination with a loose annular coiled expanding spring arranged within said packing and expanding the same, and a support for said spring arranged within the convolutions thereof.

9. A piston having a cupped packing washer, and a loosely mounted freely movable annular coiled spring resting loosely against the rear face of the body portion of the washer and within and expanding the cupped edge of said washer.

10. A piston having a flexible packing washer at its central portion secured to the central portion of the piston and loosely facing the rear thereof and having a rearwardly extending annular flexible cupped edge, in combination with loosely confined and freely movable expanding means resting against the rear face of the central portion of said washer and within and expanding said cupped edge.

In testimony whereof I affix my signature, in presence of two witnesses.

PERCY EARL WILLIAMS.

Witnesses:
F. M. OLIVER,
JAMES F. EVANS.